United States Patent [19]

Fuhr et al.

[11] Patent Number: 5,240,978
[45] Date of Patent: Aug. 31, 1993

[54] THERMOPLASTIC POLYCARBONATE MOULDING COMPOSITIONS WITH FLAME-RESISTANT PROPERTIES

[75] Inventors: Karl Fuhr, Krefeld; Friedemann Müller, Neuss; Karl-Heinz Ott, Leverkusen; Jochen Schoeps, Krefeld; Horst Peters, Leverkusen; Werner Ballas, Dormagen, all of Fed. Rep. of Germany

[73] Assignee: Bayer Aktiengesellschaft, Leverkusen Bayerwerk, Fed. Rep. of Germany

[21] Appl. No.: 886,543

[22] Filed: May 20, 1992

Related U.S. Application Data

[63] Continuation of Ser. No. 718,683, Jun. 21, 1991, abandoned.

[30] Foreign Application Priority Data

Jun. 26, 1990 [DE] Fed. Rep. of Germany ....... 4020258

[51] Int. Cl.$^5$ .................. C08K 5/52; C08L 69/00; C08L 55/02; C08L 27/18
[52] U.S. Cl. ............................ 524/141; 524/145; 524/504; 524/546; 525/67; 525/146
[58] Field of Search ............... 524/141, 145, 265, 504, 524/546; 525/67, 146

[56] References Cited

U.S. PATENT DOCUMENTS

| | | | |
|---|---|---|---|
| 4,010,144 | 3/1977 | Dannels et al. | 260/59 R |
| 4,105,825 | 8/1978 | Heath et al. | 428/379 |
| 4,260,537 | 4/1981 | Limbert | 260/45.85 B |
| 4,463,130 | 7/1984 | Serini et al. | 525/67 |
| 4,481,338 | 11/1984 | Serini et al. | 525/394 |
| 4,692,488 | 9/1987 | Kress et al. | 524/139 |
| 4,751,260 | 6/1988 | Kress et al. | 524/130 |
| 4,766,165 | 8/1988 | Kress et al. | 524/140 |
| 4,788,238 | 11/1988 | Tödtemann et al. | 524/130 |
| 4,914,144 | 4/1990 | Muehlbach et al. | 524/145 |
| 4,983,658 | 1/1991 | Kress et al. | 524/141 |
| 4,988,748 | 1/1991 | Fuhr et al. | 524/141 |

FOREIGN PATENT DOCUMENTS

| | | |
|---|---|---|
| 3429481 | 2/1986 | Fed. Rep. of Germany . |
| 3430234 | 2/1986 | Fed. Rep. of Germany . |
| 3523316 | 1/1987 | Fed. Rep. of Germany . |
| 3545609 | 6/1987 | Fed. Rep. of Germany . |
| 3615768 | 11/1987 | Fed. Rep. of Germany . |
| 3617511 | 11/1987 | Fed. Rep. of Germany . |
| 3628904 | 3/1988 | Fed. Rep. of Germany . |
| 3629546 | 3/1988 | Fed. Rep. of Germany . |
| 3444869 | 6/1989 | Fed. Rep. of Germany . |
| 3940927 | 6/1991 | Fed. Rep. of Germany . |

*Primary Examiner*—Paul R. Michl
*Assistant Examiner*—Tae H. Yoon
*Attorney, Agent, or Firm*—Joseph C. Gil; Aron Preis

[57] ABSTRACT

A flame resistant molding composition containing a polycarbonate resin, a graft polymer and, as a flame retarding agent a phosphoric acid ester of novolak in combination with an anti drip agent is disclosed. The composition may further contain a thermoplastic copolymer and/or polyalkylene terephthalate. A process for the preparation of the composition is also disclosed.

11 Claims, No Drawings

THERMOPLASTIC POLYCARBONATE MOULDING COMPOSITIONS WITH FLAME-RESISTANT PROPERTIES

This application is a continuation of application Ser. No. 07/718,683 filed Jun. 21, 1991, ABANDONED.

The present invention relates to thermoplastic moulding compositions containing

A) from 40 to 90 parts by weight, preferably from 50 to 70 parts by weight, of a thermoplastic aromatic polycarbonate.

B) one optional component selected from among
B.1) 0 to 50 parts by weight, preferably 0 to 35 parts by weight, of a thermoplastic copolymer of 50 to 95 percent by weight of at least one member selected from the group consisting of styrene, α-methylstyrene, styrene alkylated in the nucleus and a halogenostyrene and 5 to 50% by weight of at least one member selected from the group consisting of acrylonitrile, methacrylonitrile, alkyl acrylate, alkyl methacrylate, maleic acid anhydride, N-substituted maleimide and vinyl acetate, and
B.2) 0 to 80 parts by weight, preferably 0 to 60 parts by weight, of a thermoplastic polyalkylene terephthalate, C) from 1 to 25 parts by weight, preferably from 5 to 20 parts by weight, of a graft polymer prepared by grafting
C.1) from 5 to 70 parts by weight, preferably from 15 to 60 parts by weight, of a mixture of
C.1.1) from 50 to 95 parts by weight of styrene, α-methylstyrene, halogenated styrene, styrene alkylated in the nucleus, methyl methacrylate or mixtures thereof and
C.1.2) from 5 to 50% by weight of (meth)acrylonitrile, methyl methacrylate, maleic acid anhydride, N-substituted maleimide or mixtures thereof on
C.2) from 30 to 95 parts by weight, preferably from 40 to 85 parts by weight, of a rubber having a glass temperature $TG \leq 10°$ C., e.g. of polybutadiene, alkyl acrylate, EPDM (ethylene-propylene-diene monomer) or silicone rubbers, D) from 1 to 25 parts by weight, preferably from 2 to 20 parts by weight, based in each case on 100 parts by weight of the total weight of A), C) and optionally B), of a phosphorus compound, E) at least one antidripping component selected from among
E.1) 0.05 to 5 parts by weight, preferably 0.1 to 1.0 parts by weight, based on 100 parts of the total weight of A), C) and optionally B), of a tetrafluoroethylene polymer having an average particle size of 0.05 to 20 μm and a density of 1.2 to 1.9 g/cm³, preferably in the form of a coagulated mixture of an emulsion of tetrafluoroethylene E.1) with an emulsion of graft polymer C) wherein the weight ratio of said C) to said tetrafluoroethylene E.1) is from 95:5 to 60:40 and wherein the weight proportion of coprecipitate of said C) and said E.1), is 0.1 to 20.0 parts by weight based on 100 parts of the total weight of A), C) and optionally B), E.2) 0.1 to 10 parts by weight, preferably 0.2 to 3.0 parts by weight, based on 100 parts of the total weight of A), C) and optionally B) of a silicone resin conforming to formula (VII)

wherein
R denotes a monovalent hydrocarbon group which may itself be substituted, in particular a methyl group and/or a phenyl group,
R' denotes an alkyl group or hydrogen,
x has a value from 0.75 to 1.75 and
y has a value from 0.0001 to 0.5,
the silicone resin being built up of units of the formula $SiO_{4/2}$, $RSiO_{3/2}$, $R_2SiO_{2/2}$ and/or $R_3SiO_{1/2}$, a coagulated mixture of emulsions of the silicone resin E.2) and optionally also an emulsion of a solution thereof, e.g. in toluene, with emulsions of graft polymer C) being preferably used, wherein the ratio by weight of graft polymer C) to the silicone resin E.2) is from 99.9:0.1 to 50:50% by weight and the proportion of coprecipitate of C) and E.2) amounts to 0.1 to 30.0 parts by weight, based on 100 parts by weight of A), C) and optionally B), characterised in that they contain, as phosphorus compounds D), compounds corresponding to Formula (I)

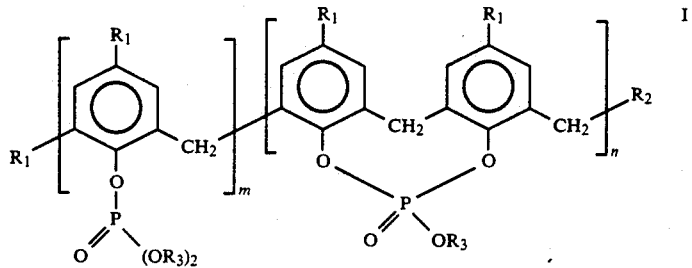

wherein
$R_1$ denotes hydrogen or an alkyl group having 1 to 8 carbon atoms, preferably methyl,
$R_2$ denotes

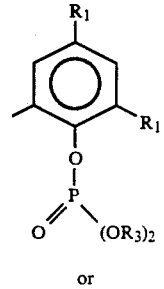

or

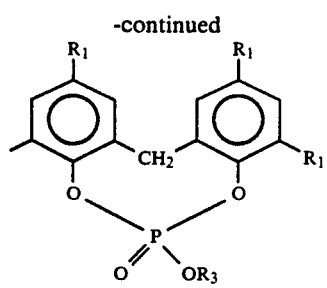

and

R₃ denotes phenyl which may be substituted by an alkyl group having 1 to 4 carbon atoms, phenyl or aralkyl such as benzyl, 1-phenylethyl or 1-methyl-1-phenylethyl.

In the above formulae, when m stands for zero, n must be equal to at least 1, and R₂ must stand for

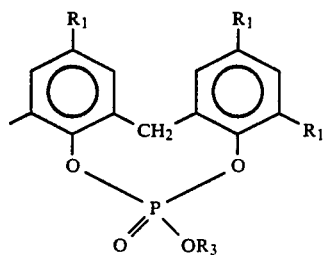

and when n=zero, m must be at least 2 and R₂ must stand for

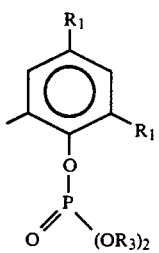

and wherein m stands for an integer from zero to 12 and n stands for an integer from zero to 5, and the nuclear number of the polyphenol molecule, i.e. the number of benzene rings in compound (I), not counting the group R₃, is not higher than 12.

Polycarbonate moulding compositions containing phosphate esters corresponding to formula (II)

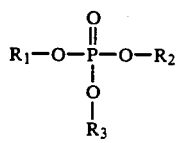

wherein

R₁, R₂ and R₃ may be identical or different and stand for C₁-C₂₀ hydrocarbon groups and at least two of the groups denoted by R₁, R₂ and R₃ are substituted or unsubstituted aryl groups are known compounds (see DE-OS 3 429 481 (Le A 23 063) and DE-OS 3 430 234 (Le A 22 925)), but the compounds corresponding to formula (I) do not occur in these disclosures.

Polycarbonate moulding compositions containing the phosphorus compounds corresponding to formula (III)

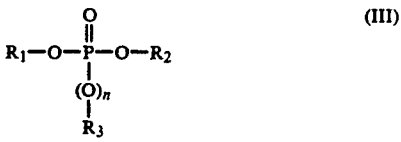

wherein

R₁, R₂ and R₃ denote, independently of one another, an optionally halogenated C₁-C₈-alkyl group or an optionally halogenated C₆-C₂₀-aryl group and n stands for 0 or 1 are also known (see EP-OS 0 174 493 (Le A 23 043-EP), DE-OS 3 444 869 (Le A 23 527), DE-OS 3 444 868 (Le A 23 502), DE-OS 3 516 807 (Le A 23 790), DE-OS 3 521 888 (Le A 23 877), DE-OS 3 523 316 (Le A 23 927), DE-OS 3 523 314 (Le A 23 940), DE-OS 3 545 609 (Le A 23 039), DE-OS 3 615 768 (Le A 24 500), DE-OS 3 617 511 (Le A 24 501), DE-OS 3 628 904 (Le A 24 683) and DE-OS 3 629 546 (Le A 24 695)).

The compounds corresponding to Formula (I) are also not mentioned in these specifications.

One of the main disadvantages of these moulding compositions containing phosphates corresponding to formulae (II) and (III) is that the phosphoric acid esters described in these documents are partly volatile under the conditions of preparation and processing. An increase in molecular weight of the phosphates by lengthening of the alkyl chains on aromatic compounds generally has hardly any effect in reducing the volatility but reduces the effectiveness of the phosphates in imparting flame resistance since it reduces the phosphorus content. Considerable quantities of phosphorus additives must therefore be used to re-establish the flame-resistant properties, but these additives have undesirable effects, for example they may reduce the Vicat temperature.

It is also known to use polyphosphates for imparting flame resistance to polycarbonate moulding compounds (see U.S. Pat. Nos. 4,463,130 (Le A 21 835) and 4,481,338 (Le A 21 841)). Although polymeric phosphates only slightly reduce the dimensional stability under heat, they have the disadvantage that the desired degree of fluidity is not achieved.

Phosphoric acid esters of polyphenols, also known as novolaks, are known as flame-retarding agents for polyolefins used in combination with large quantities of fillers and peroxides (U.S. Pat. No. 4,105,825). Polycarbonate moulding compositions are not mentioned there.

Special, less volatile phosphoric acid esters are claimed in DE-OS 3.824.356 for imparting flame-protection to polycarbonate moulding compositions. The phenol components used are arylated or aralkylated phenols mixed with phenol. It is mentioned that novolak/phenol esters of phosphoric acid may be added. The phosphoric acid esters claimed and mixture of these esters, including mixtures with phosphoric acid esters of novolaks, however, have the effect of lowering the heat distortion temperatures (Vicat temperatures).

It was surprisingly found that novolak/phenol esters of phosphoric acid in imparting to polycarbonate moulding compositions are a flame protection which corresponds to the UL 94 assessment V-O of test samples 1.6 mm in thickness while the flowability is improved and the heat distortion temperature remains at a high level. In the polycarbonate moulding compositions according to the invention, Vicat temperatures of up to 130° C. can be achieved while the high flame resistance (V-O at 1.6 mm thickness) is preserved. These temperatures undergo virtually no decrease.

The polycarbonates suitable for use as component A) according to the invention may be either homopolycarbonates or copolycarbonates of diphenols corresponding to formula (IV)

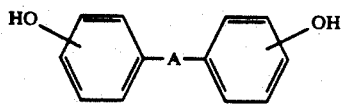
(IV)

Further, the polycarbonates used as component A) may in particular also be copolycarbonates of the diphenols (IV) and (IVa)

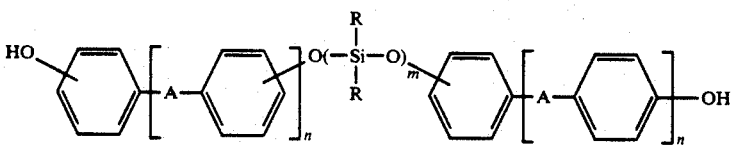
(IVa)

wherein A denotes a single bond, $C_1$–$C_5$-alkylene, $C_2$–$C_5$-alkylidene or a $C_5$–$C_6$-cycloalkylidene which may be substituted by methyl groups, or it may denote O, S, or $SO_2$ and the aromatic regions may be substituted by methyl groups or halogen atoms; n=1 or 0, the R's may be identical or different and denote a straight chained $C_1$–$C_{20}$-alkyl, a branched $C_3$–$C_{20}$-alkyl or a $C_6$–$C_{20}$-aryl, preferably $CH_3$, and m stands for a number from 5 to 100, preferably from 20 to 80, and the proportion by weight of diphenols of formula (IVa) in the copolycarbonates is in each case adjusted so that the proportion of diorganosiloxy units (V)

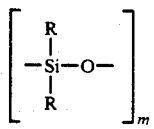
(V)

in polycarbonate A) is from 1 to 25% by weight, preferably from 2.5 to 25% by weight.

The polycarbonates of component A) may be either straight chained or branched and they may contain aromatically bound halogen, preferably bromine and/or chlorine but they may be free from aromatically bound halogen, in other words halogen-free.

The polycarbonates of component A) may be used either singly or as mixtures. When component A) is a mixture of siloxane-containing polycarbonates and siloxane-free polycarbonates, the siloxane-containing polycarbonates may contain more than 25% by weight of diorganosiloxy units, provided the proportion in the polycarbonate mixture is adjusted to 1 to 25% by weight by the addition of the siloxane-free polycarbonates.

The diphenols corresponding to formula (IV) are either known in the literature or the subject of German Patent Application P 3 842 931.4 (Le A 26 318) or may be prepared by methods known in the literature. Polydiorganosiloxanes containing hydroxyaryloxy end groups corresponding to formula (IVa) are also known (see e.g. U.S. Pat. No. 3,419,634) or may be prepared by methods known in the literature.

The preparation of polycarbonates suitable for use as component A) according to the invention is known in the literature or the subject of German Patent Application P 3 842 931.4 (Le A 26 318) and may be carried out, for example, with phosgene by the interfacial process or with phosgene by the homogeneous phase process (the so-called pyridine process), the molecular weight being adjusted to the required value in known manner by means of a suitable quantity of known chain terminators. The preparation of polycarbonates containing polydiorganosiloxanes has been described, e.g. in DE-OS 3 334 782.

Examples of suitable chain terminators include phenol, p-tert.-butylphenol, long chained alkyl phenols such as 4-(1,3-tetramethyl-butyl)-phenol according to DE-OS 2 842 005 and monoalkylphenols and dialkylphenols having a total of 8 to 20 carbon atoms in the alkyl substituents according to German Offenlegungsschrift 3 506 472, e.g. p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The quantity of chain terminators to be used is generally from 0.5 to 10 mol-%, based on the sum of the diphenols (IV) and (IVa) used.

The polycarbonates suitable for use as component A) according to the invention may be branched in known manner, preferably by the incorporation of from 0.05 to 2.0 mol-%, based on the sum of diphenols used, of trifunctional or higher than trifunctional compounds, e.g. compounds containing three or more than three phenolic OH groups.

These compounds have weight average molecular weights ($M_w$, determined e.g. by ultracentrifugation or scattered light measurement) of from 10,000 to 200,000, preferably from 20,000 to 80,000.

The following are examples of suitable diphenols of formula (IV): Hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)propane, 1,1-bis-(4-hydroxyphenyl)-cyclohexane and 1,1-bis-(4-hydroxyphenyl)-3,3,5-trimethylcyclohexane.

2,2-Bis-(4-hydroxyphenyl)-propane and 1,1-bis-(4-hydroxyphenyl)-cyclohexane are preferred diphenols corresponding to formula (IV). Mixtures of diphenols may also be used.

Suitable diphenols of formula (IVa) are those in which R stands for methyl, ethyl, propyl, n-butyl, tert.-butyl or phenyl. Mixtures of diphenols corresponding to formula (VIa) may also be used.

Preferred diphenols of formula (IVa) are those corresponding to formula (IVb)

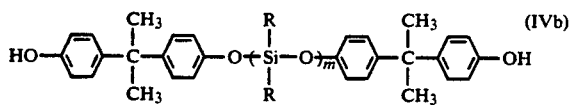

wherein the R's are identical and have the meanings indicated above, i.e. methyl, etc. or phenyl, and m again stands for an integer from 5 to 100, preferably from 20 to 80.

Copolycarbonates of diphenols of formula (IV) with diphenols of formula (IVb) are preferred polydiorganosiloxane-polycarbonate block copolymers.

Thermoplastic copolymers suitable for use as component B1) according to the invention are resinous, thermoplastic and free from rubber. Particularly preferred polymers are those of styrene, α-methylstyrene, styrene alkylated in the nucleus, halogenostyrene and mixtures thereof with acrylonitrile, methacrylonitrile, alkyl acrylate, alkyl methacrylate, maleic acid anhydride, N-substituted maleimide, vinyl acetate or mixtures thereof. Styrenes substituted in the nucleus are understood in this context to be styrenes alkylated in the nucleus, e.g. p-methylstyrene.

Particularly preferred ratios by weight in the thermoplastic polymer are, for example, 60 to 80% by weight of styrene, α-methylstyrene, styrene substituted in the nucleus, halogenostyrene or mixtures thereof and 20 to 40% by weight of acrylonitrile.

The polymers used as component B1) are known and may be prepared by emulsion, suspension, solution or solvent-free polymerisation. The polymers preferably have molecular weights $M_w$ (weight average determined by light scattering or sedimentation) of from 15,000 to 200,000.

The polyalkylene terephthalates of component B2) are reaction products of aromatic dicarboxylic acids or reactive derivatives thereof such as their dimethyl esters or anhydrides and aliphatic, cycloaliphatic or araliphatic diols or mixtures of these reaction products.

Preferred polyalkylene terephthalates contain at least 80% by weight, preferably not less than 90% by weight, based on the dicarboxylic acid component, of terephthalic acid residues and at least 80 mol-%, preferably not less than 90 mol-%, based on the diol component, of ethylene glycol and/or butane-1,4-diol groups.

The preferred polyalkylene terephthalates may contain, in addition to terephthalic acid esters, up to 20 mol-%, preferably up to 10 mol-%, of residues of other aromatic or cycloaliphatic dicarboxylic acids having 8 to 14 carbon atoms or aliphatic dicarboxylic acids having 4 to 12 carbon atoms, e.g. residues of phthalic acid, isophthalic acid, naphthalene-2,6-dicarboxylic acid, 4,4'-diphenyl-dicarboxylic acid, succinic acid, adipic acid, sebacic acid, azelaic acid or cyclohexane diacetic acid.

The preferred polyalkylene terephthalates may contain, in addition to ethylene glycol or butane-1,4-diol residues, up to 20 mol-%, preferably up to 10 mol-%, of other aliphatic diols having 3 to 12 carbon atoms or cycloaliphatic diols having 6 to 21 carbon atoms, e.g. residues of propane-1,3-diol, 2-ethylpropane-1,3-diol, neopentyl glycol, pentan-1,5-diol, hexane-1,6-diol, cyclohexane-1,4-dimethanol, 3-ethylpentane-2,4-diol, 2-methylpentane-2,4-diol, 2,2,4-trimethylpentane-1,3- and -1,6-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4hydroxypropoxyphenyl)-propane (DE-OS 2 407 674, 2 407 776 and 2 715 932).

The polyalkylene terephthalates may be branched by the incorporation of relatively small quantities of trihydric or tetrahydric alcohols or tribasic or tetrabasic carboxylic acids, e.g. according to DE-OS 1 900 270 and U.S. Pat. No. 3,692,744. Trimesic acid, trimellitic acid, trimethylolethane and -propane and pentaerythritol are examples of preferred branching agents.

Polyalkylene terephthalates which have been prepared entirely from terephthalic acid and reactive derivatives thereof (e.g. their dialkylesters) and ethylene glycol and/or butane-1,4-diol, and mixtures of these polyalkylene terephlates, are particularly preferred.

Preferred mixtures contain from 1 to 50% by weight, preferably from 1 to 30% by weight, of polyethylene terephthalate and from 50 to 99% by weight, preferably from 70 to 99% by weight, of polybutylene terephthalate.

The polyalkylene terephthalates preferably used generally have an intrinsic viscosity of from 0.4 to 1.5 dl/g, preferably from 0.5 to 1.3 dl/g, in particular from 0.6 to 1.2 dl/g, determined in phenol/o-dichlorobenzene (1:1 parts by weight) at 25° C. in an Ubbelohde viscosimeter.

The polyalkylene terephthalates may be prepared by known methods (see e.g. Kunststoff-Handbuch, Volume VIII, pages 695 et seq, Carl-Hanser-Verlag, Munich 1973).

Rubbers suitable for the preparation of the graft polymers used as component C) include in particular polybutadienes, polychloroprenes, polyisoprenes, styrene-butadiene copolymer rubbers, acrylonitrile-butadiene copolymer rubbers having gel contents above 30% by weight (determined at 20° C.), acrylate rubbers, EPDM (ethylenepropylene-diene monomer) rubbers and silicone rubbers. Suitable butadiene-styrene copolymer rubbers may contain up to 30% by weight, based on the weight of the rubber, of a lower alkyl ester of acrylic or methacrylic acid (for example, methyl methacrylate, ethyl acrylate or methyl acrylate).

Suitable alkyl acrylate rubbers include those based on $C_1$-$C_8$-alkyl acrylates, in particular ethyl-, butyl-and ethylhexyl-acrylates. These alkyl acrylate rubbers may contain up to 30% by weight, based on the weight of the rubber, of monomers such as vinyl acetate, acrylonitrile, styrene, styrene alkylated in the nucleus, halogenostyrene, methyl methacrylate and/or vinyl ethers incorporated by copolymerisation. Further, these alkyl acrylate rubbers may contain small quantities, preferably up to 5% by weight, based on the weight of the rubber, of ethylenically unsaturated monomers which have a cross-linking action. Examples of such cross-linking agents include alkylenediol di(meth)acrylates, polyester di(meth)acrylates, divinylbenzene, trivinylbenzene, triallylcyanurate, allyl (meth)acrylate, butadiene and isoprene. Such alkyl acrylates are known. Acrylate rubbers used as graft basis may be products containing a cross-linked diene rubber of one or more conjugated dienes such as polybutadiene or a copolymer of a conjugated diene with an ethylenically unsaturated monomer such as styrene and/or acrylonitrile as nucleus.

The silicone rubbers suitable for this invention contain, in a dispersed form, at least partially cross-linked, particulate silicone rubbers containing groups corresponding to the following general formulae mainly incorporated chemically:

a) $R_2SiO_{2/2}$, $RSiO_{3/2}$, $R_2R^3SiO_{1/2}$, $SiO_{4/2}$ and optionally groups corresponding to the formula
b) $R^1CH=CH—(R^2)$, optionally in combination with SH groups, wherein R = a monovalent, saturated hydrocarbon group, in particular $CH_3$ or $C_6H_5$ optionally substituted by SH, halogen or $C_1$-$C_6$-alkoxy, $R^1$ = H or $C_1$-$C_6$-alkyl, in particular H or $CH_3$, $R^2$ = a single bond or a $C_1$-$C_4$-alkylene, in particular $CH_2$ or $C_2H_4$, and $R^3$ = R or OH.

The quantities of the individual siloxane units are calculated to provide from 0 to 0.5 molar units of $R_2R^3SiO_{1/2}$, from 0 to 10 molar units of the formula $RSiO_{3/4}$ and from 0 to 3 molar units of the formula $SiO_{4/2}$ per 100 molar units of the formula $R_2SiO_{2/2}$. In preferred silicone rubbers, at least 80% of all the groups denoted by R are $CH_3$ groups.

In the group $R_2R^3SiO_{1/2}$, one of the three groups denoted by R may be a hydroxyl group. The dimethylhydroxysiloxy unit is a particularly preferred end group.

The silicone rubbers contain the groups b) in quantities of from 2 to 10 mol-%, based on the total quantity of all the groups denoted by R.

Diene rubbers, alkyl acrylate rubbers and silicone rubbers are preferred rubbers for the preparation of the graft polymers C).

The rubbers are present in the graft polymers C) in the form of at least partially cross-linked particles having an average particle size of from 0.1 to 3.0 μm, in particular from 0.1 to 0.6 μm. They are at least partially cross-linked, i.e. they have gel contents greater than 20% by weight, in particular greater than 50% by weight, most preferably from 73 to 98% by weight.

The graft polymers C) are prepared by radical graft copolymerisation of the monomer mixtures defined above of C.1.1) and C.1.2) in the presence of the rubbers C.2) which are to be grafted, and they are all known products. Preferred methods of preparation of the graft polymers C) are emulsion, solution, solvent-free and suspension polymerisation. Particularly preferred graft polymers C) are the so-called ABS polymers.

The phosphorus compounds suitable for use as component D) according to the invention may generally be prepared by known processes (for novolaks, see: Houben-Weyl, Methoden der Organischen Chemie, Volume XIV/2, pages 193-292, and Ullmanns Encyclopädie der technischen Chemie, 4th Edition, Volume 18, pages 245-257; for phosphates see, for example, Ullmanns Encyclopädie der technischen Chemie, 4th Edition, Volume 18, pages 389-391, 1979, and Houben-Weyl, Methoden der Organischem Chemie, Volume 12/1, pages 299-374.

The novolaks used are condensation products of formaldehyde and phenols corresponding to the general formula (VI)

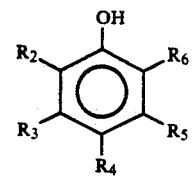

wherein $R_2$ and $R_6$ denote hydrogen atoms and $R_3$, $R_4$ and $R_5$ may stand for hydrogen, halogen, $C_1$-$C_{20}$-alkyl, cycloalkyl or $C_6$-$C_{10}$-aryl groups or $R_2$ and $R_4$ may stand for hydrogen atoms and $R_3$, $R_5$ and $R_6$ may stand for the above mentioned groups.

The following are examples of characteristic phenols but the list is not exhaustive: Phenol, o-cresol, m-cresol, p-cresol, 2,5-dimethylphenol, 3,5-dimethylphenol, 2,3,5-trimethylphenol, 3,4,5-trimethylphenol, p-t-butylphenol, p-n-octylphenol, p-stearylphenol, p-phenylphenol, p-(2-phenylethyl)-phenol, 1-phenylethylphenol, o-isopropylphenol, p-isopropylphenol and m-isopropylphenol. Numerous other phenols are also suitable.

Phenol, o-cresol, m-cresol, p-cresol, p-t-butylphenol, o-t-butylphenol and p-octylphenol are preferred.

Mixtures of these phenols may also be used.

The following novolaks are therefore preferably used but the choice is not limited to these:
Phenol/formaldehyde novolak,
o-cresol/formaldehyde novolak,
m-cresol/formaldehyde novolak,
p-cresol/formaldehyde novolak,
t-butylphenol/formaldehyde novolak and
p-octylphenyl/formaldehyde novolak.

p-Cresol/formaldehyde novolak is particularly preferred.

For the preparation of the novolak phosphate esters according to the invention, novolaks are trans-esterified with triarylesters of phosphoric acid by the so-called trans-esterification process and mixtures of novolaks and phenols are trans-esterified with phosphorus oxychloride by the so-called acid chloride process. Triphenylphosphate is the phosphoric acid ester preferably used for the trans-esterification process. In both processes, aryl and aralkylphenols such as 4-phenylphenol, benzylphenol, 1-phenylethyl-phenol, 1-methyl-1-phenylethyl-phenol and 2,4-di-(phenylethyl)-phenol may be used as additional phenols.

It is found to be a special feature of the phosphoric acid esters of novolaks that owing to the multivalency of phosphoric acid as well as of novolaks, both open structures and cyclic structures may occur, depending on whether one valency or two valencies of a particular molecule have reacted together. Cross-linking reactions which would theoretically be possible due to the multivalency of the reactants normally do not occur.

Examples of phosphorous compounds of formula (I) used as component D) according to the invention include the reaction products of 1 mol of triphenylphosphate or of phosphoric acid trichloride with 1 or 2 equivalents of novolak. Quantitative ratios intermediate between 1 and 2 equivalents of novolak could also be used. The third valency of phosphoric acid is attached to phenol or a substituted phenol, as described above.

The tetrafluoroethylene polymers used as component E.1) according to the invention are polymers having fluorine contents of from 65 to 76% by weight, preferably 70 to 76% by weight. Examples include inter alia polytetrafluoroethylene, tetrafluoroethylene-hexafluoropropylene copolymers and tetrafluoroethylene copolymers with small quantities of fluorine-free, copolymerisable ethylenically unsaturated monomers. Polymers of this type are known. They may be prepared by known processes as, for example, by the polymerisation of tetrafluoroethylene in an aqueous medium with a catalyst which forms free radicals, such as sodium, potassium or ammonium peroxydisulphate, at pressures from 7 to 71 kg/cm² and at temperatures from 0° to 200° C., preferably from 20° to 100° C. (for further details see, for example, U.S. Pat. No. 2,393,967).

The silicone resins E. 2) suitable for the present invention correspond to the overall formula (VII)

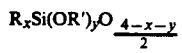  (VII)

wherein R stands for a monovalent hydrocarbon group which may itself be substituted, in particular a methyl group and/or a phenyl group and R' stands for an alkyl group or hydrogen, x has a value from 0.75 to 1.75 and y has a value from 0.0001 to 0.5, and the silicone resin is built up of uniuts of the formula $SiO_{4/2}$, $RSiO_{3/2}$, $R_2SiO_{2/2}$ and/or $R_3SiO_{1/2}$.

Those silicone resins E. 2) of formula (VII) in which at least 80% by weight of all the groups denoted by R are methyl or phneyl groups are preferred.

Further details concerning the silicone resins E.2) are given in German Offenlehungsschrift 3 815 124 (Le A 25 925).

The addition of tetrafluoroethylene polymers or silicone resins in particular has the effect of reducing or completely preventing dripping of the molten moulding compound in the event of fire.

If the moulding compounds according to the invention are prepared from components A), C), D) and optionally B) and a polytetrafluoroethylene powder E. 1) and/or a silicone resin E. 2) by, for example, melt compounding in kneaders or extruders, the moulding compounds obtained have high flame resistance but the moulded products obtained sometimes have a defective surface, for example with microcracks or streaks.

This is completely prevented by using very finely divided, unsintered tetrafluoroethylene polymers E. 1) in the form of a coagulated mixture of emulsions of tetrafluoroethylene polymers with emulsions of the graft polymers C) and/or the silicone resins E. 2) in the form of emulsions of the silicone resins E. 2) with emulsions or dispersions of the graft polymers C).

For the preparation of a suitable mixture containing tetrafluoroethylene polymer E.1), an aqueous emulsion (layex) of a graft polymer C) having average latex particles sizes of from 0.05 to 3.0 μm, in particular from 0.02 to 5.0 μm, most preferably from 0.2 to 0.6 μm, is first mixed with a finely divided emulsion in water of a tetrafluoroethylene polymer E. 1) having average particle sizes of from 0.05 to 20 μm, in particular from 0.08 to 10 μm. Suitable tetrafluoroethylene polymer emulsions normally have solids contents of from 30 to 70% by weight, in particular from 50 to 60% by weight. The emulsions of graft polymers C) to be used have solids contents of from 20 to 60% by weight, in particular from 30 to 45% by weight.

The ratio by weight of graft polymer C) to tetrafluoroethylene polymer E.1) in the emulsion mixture is from 95:5 to 60:40. The emulsion mixture is subsequently coagulated in known manner, for example by spray drying, freeze drying or coagulation by the addition of inorganic or organic salts, acids or bases or organic, water-miscible solvents such as alcohols or ketones, preferably at temperatures from 20° to 150° C., in particular from 50° to 100° C. The product may be dried if necessary at 50° to 200° C., preferably at 70° to 100° C.

Commercial products may suitably be used as the tetrafluoroethylene polymer emulsions, for example those supplied by DuPont as Teflon ® 30N.

The preparation of the pulverulent polymer mixtures of silicone resin E.2) and graft polymer C) (according to German Offenlegungsschrift 3 815 124 (Le A 25 925)) is carried out as follows:

I. A dispersion of an organic, thermoplastic polymer C) having an average particle diameter (d₅₀) of from 0.05 to 30 μm, preferably from 0.05 to 5.0 μm, most preferably from 0.2 to 0.6 μm, and having a solids content of from 20 to 60% by weight, based on the weight of the dispersion of component C), is mixed so intimately and in such quantitative proportions with an emulsion of a silicone resin E.2) of formula (VII) having an average particle diameter (d₅₀) of from 0.05 to 3 μm, preferably from 0.1 to 1 μm, and a solids content of up to 60% by weight, preferably from 30 to 50% by weight, based on the weight of the emulsion of component E.2), that virtually no agglomeration of particles takes place and that mixtures of from 0.1 to 50% by weight, preferably from 5 to 40% by weight, in particular from 8 to 20% by weight of silicone resin E.2) and 99.9 to 50% by weight, preferably from 95 to 60% by weight, in particular from 92 to 80% by weight, of thermoplastic polymer C), based on the total sum of silicone resin E.2 and thermoplastic polymer C), are obtained, II. the resulting mixture is coagulated in known manner at 20° to 120° C. and at pH values from 7 to 2, preferably from 5 to 3, to form a finely divided mixture of components C) and E.2) and III. after isolation of this coagulate, the product is dried in known manner at temperatures from 50° to 150° C., in particular at 80° to 120° C.

Since the graft polymer C) to be used according to the invention is introduced by first mixing emulsions of this graft polymer with emulsions of component E), the preparation of component C) is most suitably carried out by the process of emulsion polymerisation. The ratio of polytetrafluoroethylene E.1) to graft polymer C) employed should be chosen to provide a total amount of E.1) in the mixture of A), C) and optionally B) of from 0.05 to 5.0 parts by weight, preferably from 0.1 to 1.0 parts by weight. The corresponding ratio of silicone resin E.2) to graft polymer C) should be chosen so that the total amount of silicone resin E.2) in the mixture of A), C) and optionally B) is from 0.1 to 10.0 parts by weight, preferably from 0.2 to 3.0 parts by weight.

The thermoplastic moulding compositions according to the invention may contain additional thermoplasts such as polysulphones, polyethersulphones, polyketones, polyether ketones, polyphenylene ethers, polyarylene sulphides and other additives, such as stabilizers, pigments, flow improvers, mould release agents, antistatic agents and/or other flame retardant agents, metal and halogeno-compounds.

The present invention thus also relates to polycarbonate moulding compositions containing components A), C), D), E) and optionally B), thermoplastic polysulphones, thermoplastic polyether sulphones, thermoplastic polyketones, thermoplastic polyether ketones, thermoplastic polyphenylene ethers, thermoplastic polyarylene sulphides, stabilizers, pigments, flow improvers, mould release agents, antistatic agents and/or other flame retardant agents, metal and halogeno-compounds.

The thermoplastic moulding compositions according to the invention containing the components A), C), D), E) and optionally B), thermoplastic polysulphones, thermoplastic polyether sulphones, thermoplastic polyketones, thermoplastic polyether ketones, thermoplastic polyphenylene ethers, thermoplastic polyarylene sulphides, stabilizers, pigments, flow improvers, mould release agents and/or antistatic agents and/or other flame retardant agents, metal and halogeno-compounds are prepared by mixing the components in known manner and melt compounding or melt extruding them at temperatures from 200° to 330° C. in conventional apparatus such as internal kneaders, extruders or double shaft screws or by mixing the solutions of the aforesaid components in suitable organic solvents, for example in chlorobenzene, and concentrating the solution mixtures by evaporation in the usual apparatus, for example in evaporation extruders.

The various components may be mixed together in known manner, either successively or simultaneously, either at about 20° C. (room temperature) or at elevated temperatures.

The present invention thus also relates to a process for the preparation of thermoplastic polycarbonate moulding compositions containing the components A), C), D), E) and optionally B), polysulphones, polyether sulphones, polyketones, polyether ketones, polyphenylene ethers, polyarylene sulphides, stabilizers, pigments, flow improvers, mould release agents, antistatic agents and/or other flame retardant agents, metal and halogeno-compounds, characterised in that the above-mentioned components are mixed together in known manner and then melt compounded or melt extruded in the usual apparatus at temperatures from 200° C. to 330° C., or in that the solutions of the above mentioned components in suitable organic solvents are mixed together and the solution mixtures are concentrated by evaporation in the usual apparatus.

The moulding compositions according to the present invention may be used for the production of moulded products of all kinds. In particular, moulded articles may be produced by injection moulding. Examples of moulded products which may be obtained include housing parts of all types, cover plates for the building sector and parts for the production of motor vehicles. The products are also used in the field of electrotechnology by virtue of their excellent electrical properties.

The moulded products may also be produced by deep drawing or heat forming previously extruded plates or films.

The particle sizes given always denote the average particle diameter $d_{50}$ determined by ultracentrifuge measurements according to W. Scholtan et al, Kolloid-Z. u. Z. Polymere 250 (1972) 782-786.

EXAMPLES

A. Components used

I. Aromatic polycarbonate of 10% by weight of tetrabromo-bisphenol A and 90% by weight of biphenol A having a relative viscosity, determined in methylene chloride at 25° C., of 1.284 (0.5% by weight solution).

II. Aromatic polycarbonate of 100% by weight of bisphenol A having a relative viscosity, determined in methylene chloride at 25° C., of 1.284 (0.5% by weight solution).

III. Aromatic oligomeric carbonate of 100% by weight of tetrabromobisphenol A, Great Lakes BC-52-HP of Great Lakes Chem. Corp., USA.

IV. Thermoplastic polymer of styrene and acrylonitrile having an acrylonitrile content of 29% by weight and an average molecular weight of 60,000.

V. Polyethylene terephthalate having an intrinsic viscosity of 1.20 dl/g, determined in a phenol/o-dichlorobenzene mixture (ratio by weight 1:1) at 25° C., Ubbelohde viscosimeter.

VI. ABS graft polymer of 50% by weight of a styrene/acrylonitrile mixture (in a ratio of 70:28) on 50% by weight of particulate polybutadiene having an average particle diameter ($d_{50}$) of 0.4 μm, obtained by emulsion polymerisation.

VII. 10% by weight of a polytetrafluoroethylene-containing polymer according to VI prepared by mixing the ABS graft polymer as a latex and the polytetrafluoroethylene as a dispersion, coagulating the mixture and working it up as a coprecipitate.

VIII. 10% by weight of a polymer according to VI containing silicone resin, prepared by mixing the graft polymer as a latex and the silicone resin as an emulsion, coagulating the mixture and working up the product as a coprecipitate.

IX. Triphenylphosphate.

X. Phosphoric acid-2,4-di-(1-phenylethyl)-phenyl-bisphenyl ester according to Example 1 of German Patent Application P 3 940 927.9 (Le A 27 145).

XI. Phosphoric acid-phenyl-bis-((1-phenylethyl)-phenyl)-ester according to Example 1 of German Patent Application P 3 824 356.3 (Le A 26 015).

XII. Phosphoric acid ester of 1 mol of triphenylphosphate and 1 equivalent of novolak (from p-cresol, nuclear number about 5).

XIII. Phosphoric acid ester of 1 mol of triphenylphosphate and 1.5 equivalents of novolak (from p-cresol, nuclear number about 5).

XIV. Phosphoric acid ester of 1 mol of triphenylphosphate and 2 equivalents of novolak (from p-cresol, nuclear number about 5).

XV. Phosphoric acid ester of 1 mol of triphenylphosphate and 1 equivalent of novolak (from p-cresol, nuclear number about 3).

B. Preparation of the phosphorus additives used

1. Phosphoric acid ester of 1 mol of triphenylphosphate and 1 equivalent of novolak (from p-cresol, nuclear number about 5).

1631.5 g (5 mol) of triphenylphosphate, 599.5 g (5 mole equivalents) of a novolak of p-cresol and formaldehyde (OH number 468, index about 5) and 14.3 g of magnesium chloride (0.15 mol) are melted and then heated for 0.5 hours in a vacuum of 300 mbar at 200° C. in a 4 l flask equipped with adjustable heating mushroom, capillary and short Vigreux column with descending condenser. Mixing is effected by the stream of nitrogen introduced through the capillary. 482.5 g of product (OH number 583) are then distilled off in the course of 3 hours through the column and condenser at a vacuum descending from 300 to 3 mbar and at temperatures from 200° to 210° C. (5 mol of phenol: 470.6 g). The product is then heated for one hour at 210° C. under a vacuum of 3 mbar.

After cooling, the reaction is taken up with 4 l of methylene chloride and washed free from chloride with water. After dehydration of the methylene chloride solution with sodium sulphate, the solution is filtered and concentrated by evaporation. The yield is 1693.7 g =91.2% of the theoretical. The product is resinous, the phosphorus content is 8.9% (theoretical: 8.8%) and the OH number is 4.

2. Phosphoric acid ester of 1 mol of triphenylphosphate and 1.5 equivalents of novolak (from p-cresol, nuclear number about 5).

1305.2 g (4 mol) of triphenylphosphate, 719.4 g (6 mole equivalent) of a novolak of p-cresol and formaldehyde (OH number 468, nuclear number about 5) and 11.4 g of magnesium chloride (0.12 mol) are melted and then heated for 0.5 hours in a vacuum of 300 mbar at 200° C. in a 4-l flask equipped with adjustable heating mushroom, capillary and short Vigreux column with descending condenser. The components are thoroughly mixed together by the stream of nitrogen introduced through the capillary. 580.4 g of product (OH number 578) are then distilled off in 3.5 hours through the column and condenser in a vacuum descending from 300 to 3 mbar and at temperatures from 200° to 210° C. (6 mol of phenol: 564.6 g). The product is then heated at 210° C. under a vacuum of 3 mbar for one hour.

After cooling, the reaction product is taken up with 4 l of methylene chloride and washed free from chloride with water. After dehydration of the methylene chloride solution with sodium sulphate, the solution is filtered and concentrated by evaporation. The yield is 1378.6 g=94.3% of the theoretical yield. Softening on the Kofler heating bench begins at 72° C., the phosphorus content amounts to 9.0% (theoretical 8.5%) and the OH number is 0.

3. Phosphoric acid ester of 1 mol of triphenylphosphate and 2 equivalents of novolak (from p-cresol, nuclear number about 5).

1142.0 g (3.5 mol) of triphenylphosphate, 839.3 g (7 mole equivalents) of a novolak of p-cresol and formaldehyde (OH number 468, nuclear number about 5) and 10.0 g of magnesium chloride (0.09 mol) are melted and then heated for 0.5 hours at 200° C. and a vacuum of 300 mbar in a 4 l flask equipped with adjustable heating mushroom, capillary and short Vigreux column with descending condenser. The components are thoroughly mixed together by the stream of nitrogen introduced through the capillary. 681.7 g of product (OH number 550) are then distilled off through the column and condenser in 4 hours at a vacuum descending from 300 to 3 mbar and at temperatures from 200° to 210° C. (7 mol of phenol: 658.7 g). The product is then heated for one hour at 210° C. and a vacuum of 3 mbar.

After cooling, the reaction product is taken up with 4 l of methylene chloride and washed free from chloride with water. After dehydration of the methylene chloride solution with sodium sulphate, the solution is filtered and concentrated by evaporation. The yield is 1304.7 g=98.6% of the theoretical yield. Softening begins at 141° C. on the Kofler heating bench, the phosphorus content is 8.2% (theoretical 8.2%) and the OH number is 0.

4. Phosphoric acid ester of 1 mol of triphenylphosphate and 1 equivalent of novolak (from p-cresol, nuclear number about 3).

1631.5 g (5 mol) of triphenylphosphate, 578.5 g (5 mole equivalents) of a novolak of p-cresol and formaldehyde (OH number 485, nuclear number about 3) and 14.3 g of magnesium chloride (0.15 mol) are melted and then heated for 0.5 hours in a vacuum of 300 mbar at 200° C. in a 4 l flask equipped with adjustable heating mushroom, capillary and short Vigreux column with descending condenser. The components are thoroughly mixed by the stream of nitrogen introduced through the capillary. 472.0 g of product (OH number 547) are then distilled off through the column and condenser in 3.5 hours at a vacuum descending from 300 to 3 mbar and at temperatures from 200° to 210° C. (5 mol of phenol: 470.6 g). The product is then heated for one hour at 210° C. and a vacuum of 3 mbar.

After cooling, the reaction product is taken up with 4 l of methylene chloride and washed free from chloride with water. After dehydration of the methylene chloride solution with sodium sulphate, the solution is filtered and concentrated by evaporation. The yield is 1652.0 g=95.0% of theoretical yield. The product is resinous, the phosphorus content is 8.9% (theoretical 8.9%) and the OH number is 7.

PREPARATION AND TESTING OF THE MOULDING COMPOSITIONS RESULTS

The required components are mixed at 230° to 240° C. in the quantities (in parts by weight) shown in Table 1 in a Banbury internal kneader (Pomini-Farrel) of Model BR (1.2 l) or Model OOC (3 l) and the mixture is worked up into a granulate.

TABLE 1

| Component | I. | II. | III. | IV. | V. | VI. | VII. | VIII. | IX. | X. | XI. | XII. | XIII. | XIV. | XV. |
|---|---|---|---|---|---|---|---|---|---|---|---|---|---|---|---|
| Comparison 1 | 65.0 | | | 15.5 | | 8.0 | 4.0 | | 7.5 | | | | | | |
| Comparison 2 | | 65.0 | | 10.0 | | 8.0 | 4.0 | 13.0 | | | | | | | |
| Comparison 3 | 65.0 | | | 10.2 | | 10.0 | 2.3 | | | 12.5 | | | | | |
| Comparison 4 | 65.0 | | | 13.0 | | 8.0 | 4.0 | | | | 10.0 | | | | |
| Comparison 5 | | 65.0 | | 11.0 | | 4.0 | 4.0 | | | | 16.0 | | | | |
| Comparison 6 | 65.0 | | | 11.0 | | 4.0 | 4.0 | | | 8.0 | | | 8.0 | | |
| Example 1 | 65.0 | | | 13.0 | | 8.0 | 4.0 | | | | 10.0 | | | | |
| Example 2 | 65.0 | | | 13.0 | | 8.0 | 4.0 | | | | | 10.0 | | | |
| Example 3 | 65.0 | | | 13.0 | | 8.0 | 4.0 | | | | | | 10.0 | | |
| Example 4 | 65.0 | | | 13.0 | | 8.0 | 4.0 | | | | | | | | 10.0 |
| Example 5 | 70.0 | | 10.0 | | | | | 10.0 | | | 10.0 | | | | |
| Example 6 | | 65.0 | 6.5 | 6.5 | | 8.0 | 4.0 | | | | 10.0 | | | | |
| Example 7 | 55.0 | | 8.0 | | 13.0 | 8.0 | 4.0 | | | | 12.0 | | | | |
| Example 8 | | 70.0 | | | | 10.0 | 4.0 | | | | 16.0 | | | | |
| Example 9 | | 70.0 | | | | 10.0 | 4.0 | | | | | | | | 16.0 |
| Example 10 | | 76.0 | | | | 8.0 | 4.0 | | | | 12.0 | | | | |

The moulding compounds are injection moulded at 260° C. to form test samples (apparatus: Werner Pfleiderer screw DKS 275, locking force 275 MP, screw diameter 56 mm, length L/D-23/1) and the samples are subjected to the following tests:
Impact strength according to DIN 43 543 ($a_n$)
Notched impact strength according to DIN 53 543 ($a_k$)
Heat distortion temperature according to DIN 53 460 (Vicat B)
Fire test according to the regulations of Underwriter Laboratories (UL 94)
Table 2 shows the test data obtained.

TABLE 2

| | Test data | | | |
|---|---|---|---|---|
| | $a_n$ kJ/m² | $a_k$ kJ/m² | Vicat B °C. | UL94 1.6 mm rod |
| Comparison 1 | n.b.* | 17 | 101 | V-0 |
| Comparison 2 | n.b. | 11 | 87 | V-0 |
| Comparison 3 | n.b. | 6 | 98 | V-0 |
| Comparison 4 | n.b. | 12 | 102 | V-0 |
| Comparison 5 | n.b. | 5 | 87 | V-0 |
| Comparison 6 | n.b. | 8 | 96 | V-0 |
| Example 1 | n.b. | 14 | 115 | V-0 |
| Example 2 | n.b. | 7 | 119 | V-0 |
| Example 3 | n.b. | 6 | 126 | V-0 |
| Example 4 | n.b. | 6 | 119 | V-0 |
| Example 5 | n.b. | 11 | 118 | V-0 |
| Example 6 | n.b. | 6 | 121 | V-0 |
| Example 7 | n.b. | 12 | 120 | V-0 |
| Example 8 | n.b. | 24 | 113 | V-0 |
| Example 9 | n.b. | 21 | 112 | V-0 |
| Example 10 | n.b. | 25 | 120 | V-0 |

*not broken

Tables 1 and 2 show that the moulding compositions according to the invention (Examples 1 to 10) containing the less volatile phosphates of novolaks in the presence of conventional quantities of polytetrafluoroethylene or silicone resin have a flame resistance conforming to an assessment according to UL 94 of V-0 at a sample thickness of 1.6 mm The moulding compositions according to the invention (Examples 1 to 10) have, however, distinctly higher Vicat temperatures than the moulding compounds of the Comparison Examples (about 120° C., compared with about 100° C.).

What is claimed is:

1. A thermoplastic moulding composition consisting of
A) 40 to 90 parts by weight of a thermoplastic aromatic polycarbonate,
B) one optional component selected from among
  B.1) 0 to 50 parts by weight of a thermoplastic copolymer of 50 to 95 percent by weight of at least one member selected from the group consisting of styrene, α-methylstyrene, styrene alkylated in the nucleus and a halogenostyrene and 5 to 50% by weight of at least one member selected from the group consisting of acrylonitrile, methacrylonitrile, alkyl acrylate, alkyl methacrylate, maleic acid anhydride, N-substituted maleimide and vinyl acetate, and
  B.2) 0 to 80 parts by weight of a thermoplastic polyalkylene terephthalate,
C) 1 to 25 parts by weight of a graft polymer prepared by grafting
  C.1) 5 to 70 parts by weight of a mixture of
    C.1.1) 50 to 95% by weight of at least one member selected from the froup consisting of styrene, α-methylstyrene, halogenostyrene, styrene alkylated in the nucleus and methyl methacrylate, and
    C.1.2) 5 to 50% by weight of at least one member selected from the group consisting of (meth)acrylonitrile, methyl methacrylate, maleic acid anhydride and N-substituted maleimide, on
  C.2) 30 to 95 parts by weight of a rubber having a glass temperature $TG \leq 10°$ C.,
D) 1 to 25 parts by weight, based on 100 parts by weight of the total weight of A), C) and optionally B) of a phosphorus compound,
E) an antidripping agent consisting of at least one member selected from the group consisting of
  E.1) 0.05 to 5 parts by weight based on 100 parts by weight of A), C) and optionally B), of a tetrafluoroethylene polymer having average particle sizes of from 0.05 to 20 μm and a density of 1.2 to 1.9 g/cm³ and
  E.2) 0.1 to 10 parts by weight, based on 100 parts by weight of A), C) and optionally B) of a silicone resin corresponding to formula (VII)

$$R_xSi(OR')_yO_{\frac{4-x-y}{2}} \qquad (VII)$$

wherein
R is a monovalent hydrocarbon group which may be substituted,
R' is an alkyl group or a hydrogen atom,
x is 0.7 to 1.75 and
y is 0.0001 to 0.5
and wherein the silicone resin is built up of at least one unit selected from the group consisting of $SiO_{4/2}$, $RSiO_{3/2}$, $R_2SiO_{2/2}$ and $R_3SiO_{1/2}$ said phosphorus compound D) corresponding to formula (I)

(I) [structural formula]

wherein
$R_1$ is a hydrogen atom or an $C_{1-8}$-alkyl,
$R_2$ is

[structural formula]

or

-continued

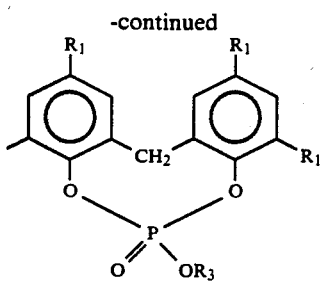

and

R₃ is phenyl, unsubstituted or substituted by at least one substituent selected from the group consisting of $C_1$-$C_4$-alkyl, phenyl and aralkyl, where in the embodiments where m is 0, n is at least 1 and R₂ denotes

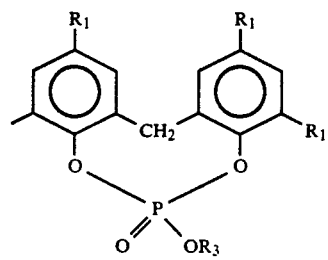

and where in the embodiments where n is 0, m is at least 2 and R₂ denotes

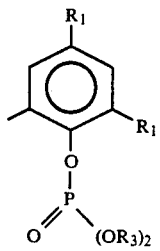

and where in the embodiments where m is an integer from 0 to 12 and n an integer from 0 to 5, the number of benzene rings in compound (I) exclusive of the rings of said R₃, is not greater than 12.

2. The molding composition of claim 1 wherein component D) is present in a quantity of 2 to 20 parts by weight.

3. The thermoplastic molding composition of claim 1 wherein said component A) is a homopolycarbonate or a copolycarbonate based on at least one diphenol of formula (IV)

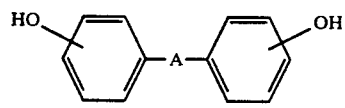

and optionally of formula (IVa)

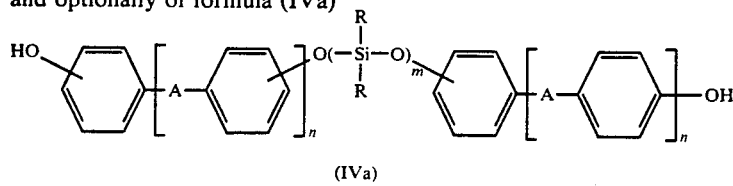

wherein
A stands for a single bond, $C_1$-$C_5$-alkylene, $C_2$-$C_5$ alkylidene or $C_5$-$C_6$-cycloalkylidene which may be substituted by methyl groups; or it may stand for O, S or $SO_2$, and the aromatic regions may be substituted by methyl groups or halogen atoms; n=1 or 0; the R's, which may be identical or different, stand for a straight chained $C_1$-$C_{20}$-alkyl, a branched $C_3$-$C_{20}$-alkyl or $C_6$-$C_{20}$-aryl, m stands for a number from 5 to 100 and the proportion by weight of diphenols of formula (IVa) in the copolycarbonates is always calculated to ensure that the proportion of diorganosiloxane units (V)

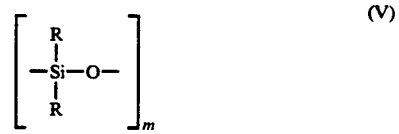

in the polycarbonate A is from 1 to 25% by weight.

4. The polycarbonate molding composition of claim 1 wherein component A) is a mixture of siloxane-containing polycarbonates and siloxane-free polycarbonates.

5. The molding composition of claim 1 wherein said C) comprise 15 to 60 parts by weight of a mixture of said C.1.1) and said C.1.2) and 40 to 85 parts by weight of said C.2).

6. The molding composition of claim 1 wherein said E.1) is present in an amount of 0.1 to 1.0 parts by weight.

7. The molding composition of claim 1 wherein said E.1) is a coagulated mixture of an emulsion of tetrafluoroethylene polymer with an emulsion of a graft polymer C), wherein the ratio by weight of graft polymer C) to said tetrafluoroethylene polymer E.1) is from 95:5 to 60:40 and the proportion of coprecipitate of C) and E.1), based on 100 parts by weight of A), C) and optionally B), is 0.1 to 20.0 parts by weight.

8. The molding composition of claim 1 wherein said E.2) is present in an amount of 0.2 to 3.0 parts by weight.

9. The molding composition of claim 1 wherein said E.2) consists of a coagulated mixture of an emulsion of said silicone resin E.2) with an emulsion of the graft polymers C), wherein the ratio by weight of graft polymer C) to the silicone resin E.2) is from 99.9:0.1 to 50:50 and the proportion of coprecipitate of C) and E.2), based on 100 parts by weight of A), C) and optionally B), is 0.1 to 30.0 parts by weight.

10. The molding composition of claim 1 further containing at least one member selected from the group consisting of thermoplastic polysulphone, thermoplastic polyether sulphone, thermoplastic polyketone, thermoplastic polyether ketone, thermoplastic polyphenylene ether and thermoplastic polyarylene sulphide.

11. The molding composition of claim 1 further containing at least one member selected from the group consisting of a stabilizer, pigment, flow improver, mold release agent, an antistatic agent and metal and halogeno compounds.

* * * * *